Nov. 26, 1963 C. VAN DER LELY 3,112,002
TRACTORS
Filed March 1, 1961 2 Sheets-Sheet 1
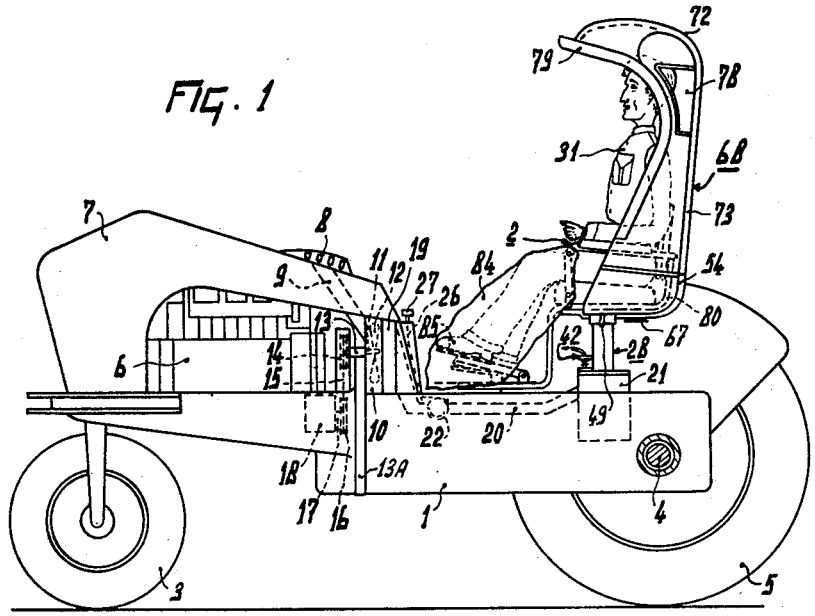
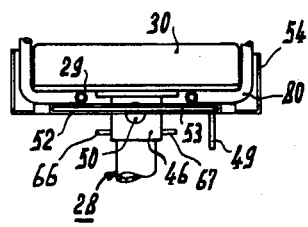
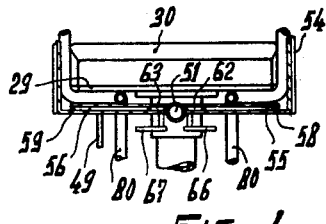
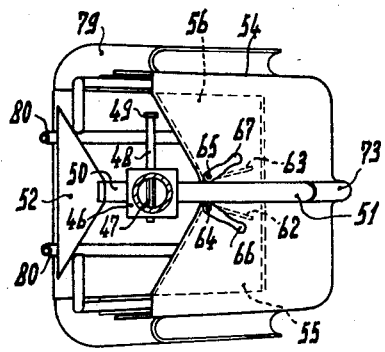
INVENTOR.
CORNELIS VAN DER LELY
BY
Mason, Mason & Albright
ATTORNEYS Nov. 26, 1963  C. VAN DER LELY  3,112,002
TRACTORS
Filed March 1, 1961  2 Sheets-Sheet 2
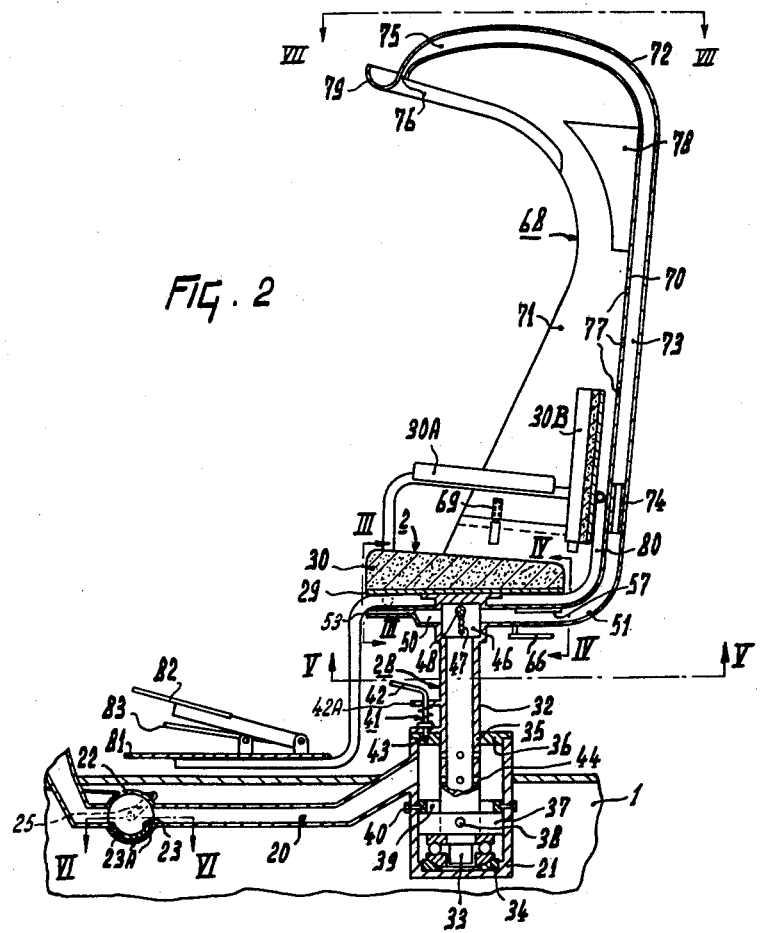
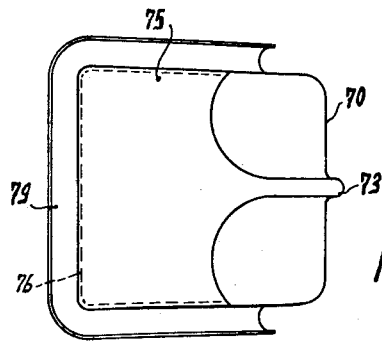
INVENTOR.
CORNELIS VAN DER LELY
BY
Mason, Mason & Albright
Attorneys

3,112,002
TRACTORS
Cornelis van der Lely, Zug, Switzerland, assignor to C. van der Lely N.V., Maasland, Netherlands, a Dutch limited-liability company
Filed Mar. 1, 1961, Ser. No. 92,590
Claims priority, application Netherlands Mar. 14, 1960
10 Claims. (Cl. 180—54)

This invention relates to tractors and has as an object to provide protection against adverse weather conditions for tractor drivers.

According to the present invention there is provided a tractor having a system for distributing air to the region in which the driver's seat of the tractor is located, the system including means adapted, during its operation, to form a downwardly flowing curtain of air in front of the said seat.

For a better understanding of the invention and to show how the same may be carried into effect, reference will now be made, by way of example, to the accompanying drawings, in which:

FIGURE 1 is a side elevation of a tractor provided with a seat and air circulating system according to the present invention, FIGURE 2 is a sectional view, to an enlarged scale, of the seat and air circulating system shown in FIGURE 1, FIGURE 3 is a sectional view taken along the line III—III of FIGURE 2, FIGURE 4 is a sectional view taken along the line IV—IV of FIGURE 2, FIGURE 5 is a sectional view taken along the line V—V of FIGURE 2, FIGURE 6 is a sectional view taken along the line VI—VI of FIGURE 2, and FIGURE 7 is a plan view taken along the line VII—VII of FIGURE 2.

Referring to the drawings, FIGURE 1 illustrates a tractor having three ground wheels, one of which is steerable and is denoted by the reference numeral 3. The other two wheels, denoted by the reference numeral 5, are unsteerable wheels. The two unsteerable wheels are rotatable about a common axle 4 and for the sake of simplicity one of the wheels 5 has been omitted from the drawings and the axle 4 shown in section. The tractor has a chassis 1 on which is mounted an engine 6 and a seat 2 for a driver 31. The engine 6 is covered by a bonnet 7 which is provided with an air inlet 8 communicating with a ducting 9 which leads to a chamber 10. Arranged in the chamber 10 is a fan 12 which is adapted to rotate on a shaft 11 journalled in a bearing 13 which is rigidly secured to the chassis 1 by means of a support member 13A. A pulley 14 is secured to the shaft 11 on the side of the bearing 13 remote from the fan 12. The pulley 14 is adapted to be driven by a belt 15 coupled to a pulley 16 secured to a shaft 17 driven by a gear-box 18 of the engine 6.

A radiator 19 is disposed in the chamber 10 and behind this radiator and on the side thereof remote from the fan 12 there is provided a duct 20 leading to a further chamber 21. A valve 23 is arranged within a valve housing 22 provided in the duct 20 and is rotatable about trunnion pins 24 (see FIGURES 2 and 6). One of the trunnion pins 24 has secured thereto a lever 25 which is connected by means of a Bowden cable 26 to a rod 27. The wall of the valve housing 22 is provided with holes 23A which allow air displaced by the fan 12 to escape when the valve 23 is wholly or partly closed. The seat 2 has a vertically disposed support 28 upon which is mounted a plate 29 having a seat squab 30 secured thereto. The seat 2 is also provided with elbow rests 30A and a back 30B. The seat support 28 is formed by a hollow tube 32 which extends in a substantially vertical direction from the bottom of the chamber 21 to a point beneath the plate 29. At its lower end the tube 32 is provided with a portion 33 projecting into a thrust bearing 34 on which the tube 32 is axially rotatable. A ring 37 is secured to the tube 32 by means of a pin 38. The ring 37 is disposed on the tube 32 between the bearing 34 and a spacer 39 which is secured to the chamber 21 by means of bolts 40. The tube 32 extends from the chamber 21 through a substantially air-tight hole 35 formed in a removable lid 36 of the chamber 21.

In this way the tube 32 and the seat 2 are turnable about the center line of the tube but are prevented from movement in an axial direction and prevented from a movement in any direction laterally of the center line of the tube 32. A lug 42A is secured to the tube 32 and carries a locking pin 42 which is adapted to be located in any one of a plurality of holes 43 formed in the lid 36. The locking pin 42 is retained in one of the holes 43 by means of a compression spring 41 disposed about the pin 42 and bearing between the underside of the lug 42A and a collar formed on the said locking pin. In this way the seat may be fixed in a plurality of different angular settings about the axis of the tube 32. Holes 44 are formed in that portion of the tube 32 which is located in the chamber 21 so that air conveyed by the fan 12 to the chamber 21 may pass into the tube 32. A valve 47 located in a valve housing 46 is disposed at the upper end of the tube 32 and is adapted to be turned on a shaft 48 which projects through the walls of the valve housing 46 and is provided at one of its ends with a lever 49 (see FIGURES 3 and 5). The tube 32 is open to the housing 46 in which the valve 47 is accommodated.

Two ducts 50 and 51 extend from the valve housing 46 in substantially horizontal directions. The duct 50 projects towards the front of the seat and opens into a dovetail shaped portion 52. The portion 52 has an opening 53 which extends parallel to and substantially throughout the full width of the front of the seat and is shaped in the form of a narrow slot (see FIGURES 3 and 5). The duct 51 extends rearwardly from the valve housing 46 and is bent upwardly behind the back portion 30B of the seat 2.

A support member 54 integral with the duct 51 surrounds the bottom, the sides and the rear of the seat and at that portion located underneath the seat forms a double wall providing ducts 55 and 56. The ducts 55 and 56 are open to the duct 51 via slots 57 (FIGURE 2). Further openings 58 and 59 to direct air towards elbow rests 30A are provided in the ducts 55 and 56, these openings 58 and 59 being located on either side of the seat 2. Valves 62 and 63 are respectively provided in the ducts 55 and 56 and are adapted to be turned about pivot pins 64 and 65 by means of levers 66 and 67 connected thereto. The support member 54 is adapted to receive a detachable hood 68 which is secured thereto by coupling members 69 and a guide member 74 located about the duct 51. The hood 68 is provided with side walls 71 between which is a rear wall 70 which extends forwardly over and above the said walls 71 to form a roof portion 72. A support for the roof portion in the form of a duct 73 fits over the guide member 74 and is disposed on the rear wall 70 in such a way that it forms a continuation of the duct 51. The duct 73 opens at the roof portion 72 into a chamber 75 which extends over substantially the whole of the roof portion (see FIGURES 2 and 7). The chamber 75 has a narrow opening 76 which extends along the leading edge and a large part of the sides of the roof portion 72 at substantially the height of the forehead of the driver 31. The vertical portion of the duct 73 is provided with holes 77 opening out into the space enclosed by the walls 70, 71 and 72. Curved windows 78 are provided in the hood 68 and extend from the duct 73 around the rear and side walls of the hood. Around the leading edge of the hood 68 there is provided a gutter 79 which extends along the side walls 71 and is capable of draining any rainwater falling on the roof of the hood.

A footplate 81 is secured to the plate 29 of the seat 2 by means of rods 80. The footplate 81 is provided with a brake pedal 82 and an accelerator pedal 83. The tractor driver may be further protected by a covering 84 which extends from the elbow rests 30A to the footplate 81 and thus protects the driver's legs and feet. This covering may be made of a flexible material such as for example, synthetic plastic. For the sake of simplicity the steering mechanism is not shown but it will be evident that the tractor will include a suitable form of steering mechanism.

During operation the fan 12 driven by the motor 6 through the intermediary of the gearbox 18 will suck in air through the inlet 8 provided on the bonnet 7. The air will be conveyed to the chamber 10 via the duct 9 and will be blown by the fan through the radiator 19 into the duct 20. When the valve 23 is open as shown in FIGURE 2, warm air flows through the duct 20 into the chamber 21. The air is then forced through the holes 44 into the tube 32 which conveys it to the valve housing 46. The position of the valve 47 shown in FIGURE 2 allows the air to flow into both the duct 50 and the duct 51. The air entering the duct 50 flows through the dovetail shaped portion 52 towards the leading edge of the seat 2 and from there underneath the leg covering around the legs of the occupant. The air flowing into the duct 51 is conveyed through the slots 57 into the ducts 55 and 56 from whence the air will escape towards the elbow rests 30A and flow around the arms and hands of the driver 31.

Air will also be conveyed to the duct 73 when the hood 68 is in position and will be conveyed to the chamber 75 and through the opening 76 to form a curtain of air extending downwardly in front and at the sides of the driver. Air from the duct 73 also passes through the holes 77 provided therein and will circulate around the driver's back. With the aid of the valve 47 either the duct 50 or the duct 51 may be blocked and the valves 62 and 63 are adapted to control the amount of air passing into the ducts 55 and 56 by closing the slots 57. If desired, valves may be provided to control the amount of air passing through the holes 77.

The direction of rotation of the fan 12 may be altered so that the reverse process can take place in which air is taken in through the air system and blown out through the inlet 8 so that air is circulated around the seat. It is also possible to take air into the duct 20 without preheating it by means of the radiator 19 so that a large quantity of cool air may be supplied to the seat.

It will be clear that the hood 68 is turnable together with the seat 2 and the support 28 about the axis of the tube 32. During operation of the tractor the locking pin 42 will be engaged in one of the holes 43 which is such that the driver 31 faces in the direction in which the tractor is moving or in such direction that he can watch the operation of an implement being pushed or towed by the tractor. Since the hood 68 takes up a position corresponding to that of the seat 2 the driver 31 will have an uninterrupted view forwardly of the seat in any position of the latter and will be able to see to both left and right and rearward through the windows 78.

The shape of the hood 68 is such that it does not hinder the driver 31 from mounting or dismounting from the seat 2. The gently curved edges of the hood 68 make injury to the driver 31 thereby most unlikely should the tractor collide with an obstacle or the like in such a way that the driver is displaced from the seat 2.

Furthermore, the heated air need not necessarily be obtained from the radiator. For instance air used to cool lubricating oil systems may be utilized or, in the case where an air-cooled engine is used to propel the tractor, the air used to cool the engine may after be directed to the seat air circulating system.

The hood can be readily removed from the seat by loosening the coupling members 69 and since the support 54 and the duct 51 do not project above the elbow rests 30A the driver 31 of the tractor will be unhindered by them.

What I claim is:

1. In combination with a tractor having a driver's seat and heat exchange means, a heating or cooling system which comprises a blower in association with said heat exchange means for moving air therethrough, an air duct leading from said heat exchange means to the region of said driver's seat, a hood interconnected to and extending upwardly in relation to said driver's seat, said hood including a roof portion extending over said driver's seat, said hood being open in its forward aspect, said hood including a continuing air duct extending from said first mentioned air duct to said roof portion, and air discharge means in the forward part of said roof portion connected to said continuing air duct, whereby air is conveyed from said heat exchange means through said first mentioned air duct and said continuing air duct out of said air discharge means to form a protective curtain of air extending downwardly in a forward aspect of said hood.

2. In combination with a tractor having a driver's seat, and heat exchange means, a heating or cooling system which comprises a blower in association with said heat exchange means for moving air therethrough, an air duct leading from said heat exchange means to said driver's seat, a hood connected to and extending over said driver's seat, said hood being open in its forward aspect, said hood including a continuing air duct extending from said first mentioned air duct into said roof portion, air apertures disposed in said continuing duct whereby air from said continuing duct circulates around the back of a driver in said seat, air discharge means in the forward part of said roof portion connecting to said continuous air duct, whereby air is conveyed from heat exchange means through said first mentioned air duct and said continuing air duct out of said discharge means to form a protective curtain of air extending downwardly in a forward aspect of said hood.

3. In combination with a tractor having a driver's seat and heat exchange means, a heating or cooling system which comprises a blower in combination with said heat exchange means for moving air therethrough, an air duct leading from said heat exchange means to said driver's seat, a hood connected to and extending upwardly from said driver's seat, said hood including a roof portion extending over said driver's seat, said hood being open in its forward aspect, said hood including a continuing air duct extending from said first mentioned air duct into said roof portion, a narrow opening extending along the forward aspect of said roof portion connected to said continuing air duct, a further duct disposed under said seat leading from said first mentioned air duct whereby air in said duct is circulated around the legs of a driver in said seat and air is conveyed from said heat exchange means through said first mentioned air duct into said continuing air duct and out of said opening to form a protective curtain of air extending downwardly in a forward aspect of said hood.

4. A heating or cooling system in accordance with claim 3 having valve means for selectively controlling the volume of air from said first mentioned duct into said continuing duct and also for controlling the volume of air from said first mentioned duct into said further duct.

5. In combination with a tractor having a driver's seat and heat exchange means, a heating or cooling system which comprises a blower in association with said heat exchange means for moving air therethrough, an air duct leading from said heat exchange means to said driver's seat, a hood connected to and extending upwardly from said driver's seat, said hood including a roof portion extending over said driver's seat, said hood being open in its forward aspect, said hood including a continuing air duct extending from said first mentioned air duct into said roof portion, a narrow opening extending along the forward part of said roof portion connected to said continuing air duct, air conduit means leading from said first mentioned air duct conveying air upwardly from the sides of said driver's seat, whereby further air is conveyed from said air heating means through said first mentioned air duct and said continuing duct out of said opening to form a protective curtain of air extending downwardly in a forward aspect of said hood.

6. In combination with a tractor having a driver's seat and a heat exchange means, a heating or cooling system which comprises a blower in association with said heat exchange means for moving air therethrough, an air duct leading from said heat exchange means to the region of said driver's seat, a hood interconnected to and extending upwardly from said driver's seat, said hood including a roof portion extending over said driver's seat, said hood being open in its forward aspect, said hood including a continuing air duct extending from said first mentioned air duct into said roof portion, a slot extending substantially across the roof of said driver's seat disposed in the forward part of said roof portion, said slot being connected to said continuing air duct, whereby air is conveyed from said heat exchange means through said first mentioned air duct and said continuing air duct out of said slot to form a protective curtain of air extending downwardly in the forward aspect of said hood.

7. In combination with a tractor having a driver's seat and heat exchange means constituting a cooler for the tractor's engine, a heating system which comprises a blower in association with said heat exchange means provided to blow air through said cooler, an air duct leading from said heat exchange means to said driver's seat, a hood connected to and extending upwardly from the region of said driver's seat, said hood including a roof portion extending over said driver's seat, said hood being open in its forward aspect, said hood including a continuing air duct extending from said first mentioned air duct into said roof portion, and air discharge means in the forward part of said roof portion connected to said continuing air duct, whereby air is conveyed from said heat exchange means through said first mentioned air duct and said continuing air duct out of said air discharge means to form a protective curtain of air extending downwardly in the forward aspect of said hood.

8. In combination with a tractor having a driver's seat and heat exchange means constituting a cooler for the tractor's lubrication system, a heating system which comprises a blower in association with said heat exchange means provided to blow air through said cooler, an air duct leading from said heat exchange means to the region of said driver's seat, a hood connected to and extending upwardly from said driver's seat, said hood including a roof portion extending over said driver's seat, said hood being open in its forward aspect, said hood including a continuing air duct extending from said first mentioned air duct into said roof portion, air discharge means extending along the forward part of said roof portion and connected to said continuing air duct, whereby air is conveyed from said heat exchange means through said first mentioned air duct and said continuing air duct out of said air discharge means to form a protective curtain of air extending downwardly in the forward aspect of said hood.

9. In combination with a tractor having a driver's seat, a system for distributing air which comprises a blower for moving air therethrough, an air duct leading from said blower to the region of said driver's seat, a hood interconnected to and extending upwardly in relation to said driver's seat, said hood including a roof portion extending over said driver's seat, said hood being open in its forward aspect and air discharge means in the forward part of said roof portion connected to said air duct whereby air is conveyed by said blower through said air duct out of said air discharge means to form a protective curtain of air extending downwardly in a forward aspect of said hood.

10. In combination with a tractor having a frame and a driver's seat mounted on said frame so as to be rotatable about a substantially vertical axis, a system for distributing air, which comprises a blower for moving air therethrough, an air duct leading from said blower to the region of said driver's seat, a hood interconnected to and extending upwardly in relation to said driver's seat and being rotatable with the seat about said vertical axis, said hood including a roof portion extending over said driver's seat, said hood being open in its forward aspect, said hood including a continuing air duct extending from said first mentioned air duct to said roof portion and being rotatable about said vertical axis with respect to said first mentioned air duct and air discharge means in the forward part of said roof portion connected to said continuing air duct, whereby air is conveyed by said blower through said first mentioned air duct and said continuing air duct out of said air discharge means to form a protective curtain of air extending downwardly in a forward aspect of said hood.

References Cited in the file of this patent

UNITED STATES PATENTS

| | | |
|---|---|---|
| 1,637,488 | Knopp | Aug. 2, 1927 |
| 1,757,080 | Ferrara | May 6, 1930 |
| 1,826,471 | James | Oct. 6, 1931 |
| 2,021,569 | Pasco | Nov. 19, 1935 |
| 2,052,471 | Hula | Aug. 25, 1936 |
| 2,112,101 | Kliesrath | Mar. 22, 1938 |
| 2,151,865 | Nallinger | Mar. 28, 1939 |
| 2,301,512 | Bresse | Nov. 10, 1942 |
| 2,532,948 | Sanden | Dec. 5, 1950 |
| 2,567,349 | Reason | Sept. 11, 1951 |
| 2,667,379 | Baze | Jan. 26, 1954 |
| 2,718,839 | Wilfert | Sept. 27, 1955 |
| 2,817,281 | Schwan et al. | Dec. 24, 1957 |
| 2,920,829 | Shane | Jan. 12, 1960 |

FOREIGN PATENTS

| | | |
|---|---|---|
| 583,656 | Great Britain | Dec. 23, 1946 |
| 502,345 | Italy | Nov. 29, 1954 |
| 1,093,716 | France | Nov. 24, 1954 |